United States Patent
Iverson et al.

(10) Patent No.: US 12,296,377 B2
(45) Date of Patent: May 13, 2025

(54) SYSTEM AND METHOD FOR CASTING WITH MOLD HAVING THERMALLY TAILORED WALL

(71) Applicant: General Electric Company, Schenectady, NY (US)

(72) Inventors: Jared Micheal Iverson, Amalga, UT (US); Shenyan Huang, Niskayuna, NY (US); Christopher Raymond Hanslits, Union, SC (US); Canan Uslu Hardwicke, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/966,630

(22) Filed: Oct. 14, 2022

(65) Prior Publication Data
US 2024/0123492 A1 Apr. 18, 2024

(51) Int. Cl.
| | |
|---|---|
| B33Y 80/00 | (2015.01) |
| B22C 9/06 | (2006.01) |
| B22C 9/22 | (2006.01) |
| B22D 27/04 | (2006.01) |
| B28B 1/00 | (2006.01) |
| B28B 17/00 | (2006.01) |
| B33Y 50/02 | (2015.01) |

(52) U.S. Cl.
CPC .............. B22C 9/06 (2013.01); B22C 9/22 (2013.01); B22D 27/045 (2013.01); B28B 1/001 (2013.01); B28B 17/0081 (2013.01); B33Y 50/02 (2014.12); B33Y 80/00 (2014.12)

(58) Field of Classification Search
CPC ........ B22D 27/04; B22D 27/045; B22C 9/22; B22C 9/24
See application file for complete search history.

(56) References Cited

U.S. PATENT DOCUMENTS

| | | | | |
|---|---|---|---|---|
| 4,170,256 | A * | 10/1979 | Blazek | B28B 1/38 164/122 |
| 7,779,890 | B2 | 8/2010 | Frasier et al. | |
| 2013/0022803 | A1* | 1/2013 | Schaeffer | F01D 5/147 164/122.2 |
| 2014/0127032 | A1* | 5/2014 | Naik | B22D 30/00 164/122.2 |
| 2018/0009128 | A1* | 1/2018 | Sokol | B33Y 10/00 |
| 2018/0071817 | A1* | 3/2018 | Torpey | C30B 11/002 |
| 2018/0297232 | A1* | 10/2018 | Kraleti | F01D 5/187 |
| 2019/0217381 | A1 | 7/2019 | Tallman et al. | |

FOREIGN PATENT DOCUMENTS

| | | |
|---|---|---|
| CN | 103231025 A | 8/2013 |
| CN | 103464690 A | 12/2013 |
| KR | 20190117833 A | 10/2019 |

OTHER PUBLICATIONS

PCT International Search Report and Written Opinion for Application No. PCT/US2023/076362 dated Feb. 8, 2024; 12 pages.

* cited by examiner

Primary Examiner — Kevin E Yoon
Assistant Examiner — Jacky Yuen
(74) Attorney, Agent, or Firm — Fletcher Yoder, P.C.

(57) ABSTRACT

A system is provided with a controller configured to receive a computer model of a mold configured to cast a part. The computer model has a variable wall thickness of the mold thermally tailored to a geometry of the part. The controller is configured to control a manufacturing system to produce the mold based on the computer model.

19 Claims, 10 Drawing Sheets

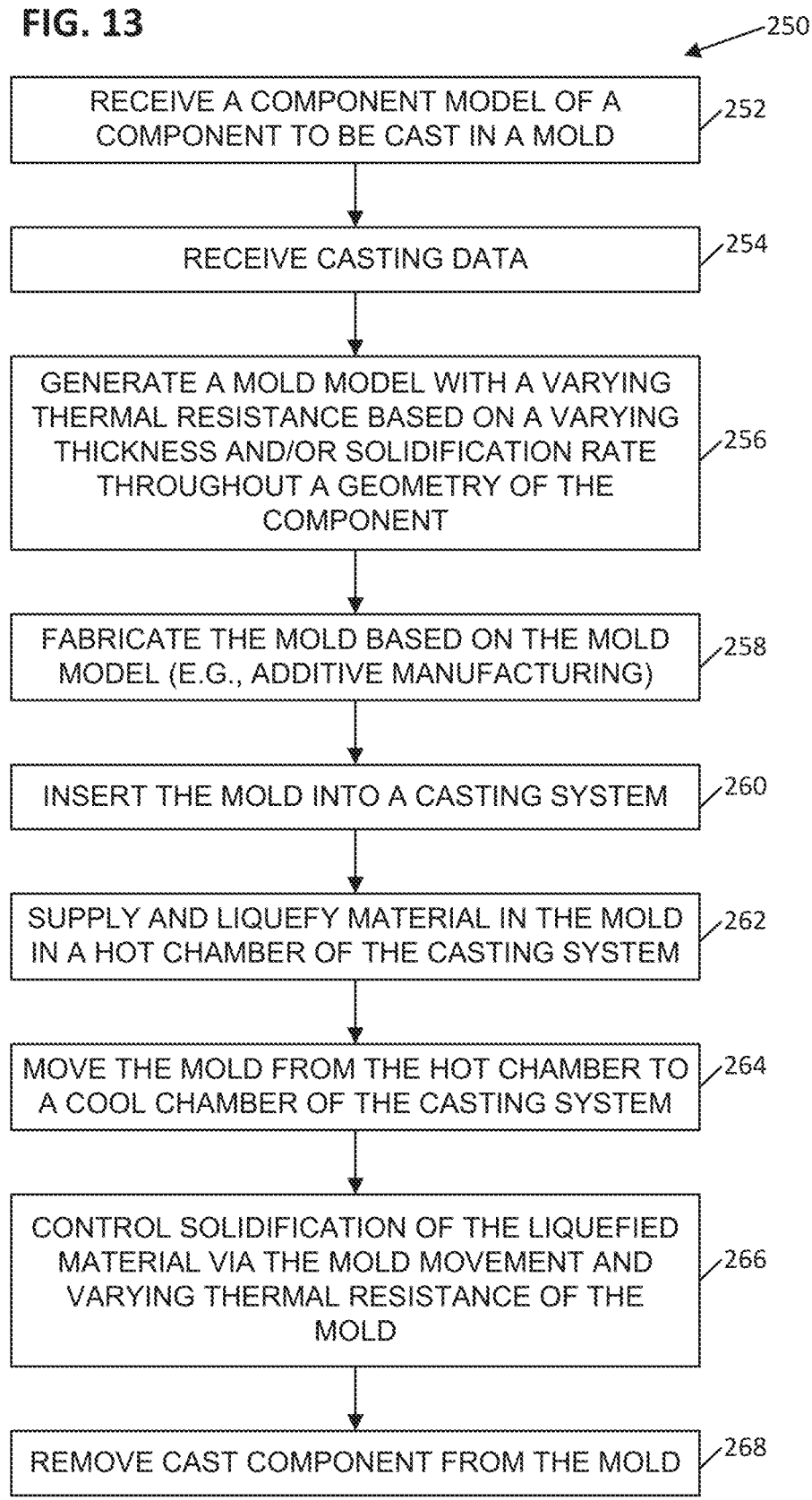

SYSTEM AND METHOD FOR CASTING WITH MOLD HAVING THERMALLY TAILORED WALL

BACKGROUND

The present application relates generally to a gas turbine system and, more specifically, to systems and methods for casting components of the gas turbine system.

A gas turbine system may include a compressor, a combustor, and a turbine. Various parts of the gas turbine system may have complex geometries, which are difficult to manufacture via a casting process. For example, a part of the compressor or the turbine (e.g., blade or vane) may have a complex geometry with variations in thickness or cross section area throughout the part. Unfortunately, the complex geometry can lead to difficulties in the casting process, because the variations in thickness generally cause variations in the cooling and solidification of the part, as the amount of latent heat generated during solidification is proportional to the metal cross section area. Usually, a large cross section or thicker wall location tends to have a slower cooling rate and thermal gradient, which increases the chance of grain defect formation such as stray grains, slivers, freckles. A mold having a constant wall thickness will not address these variations in thickness, thereby leading to an undesirable cooling and solidification of the part during the casting process. Therefore, a need exists for a mold tailored to the complex geometry, and particularly the variations in thickness, of the part to help improve the cooling and solidification of the part during the casting process.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes a controller configured to receive a computer model of a mold configured to cast a part, wherein the computer model has a variable wall thickness of the mold thermally tailored to a geometry of the part. The controller is configured to control a manufacturing system to produce the mold based on the computer model.

In certain embodiments, a method includes receiving, via a controller, a computer model of a mold configured to cast a part, wherein the computer model has a variable wall thickness of the mold thermally tailored to a geometry of the part. The method also includes controlling, via the controller, a manufacturing system to produce the mold based on the computer model.

In certain embodiments, a system includes a controller configured to receive a computer model of a mold configured to cast a part, wherein the computer model has a variable wall thickness of the mold thermally tailored to a geometry of the part. The controller is configured to control a manufacturing system to produce the mold based on the computer model.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein:

FIG. 13 is a flow chart of an embodiment of a manufacturing process for casting the part with the mold of FIGS. 1-7.

DETAILED DESCRIPTION

Figure 1:
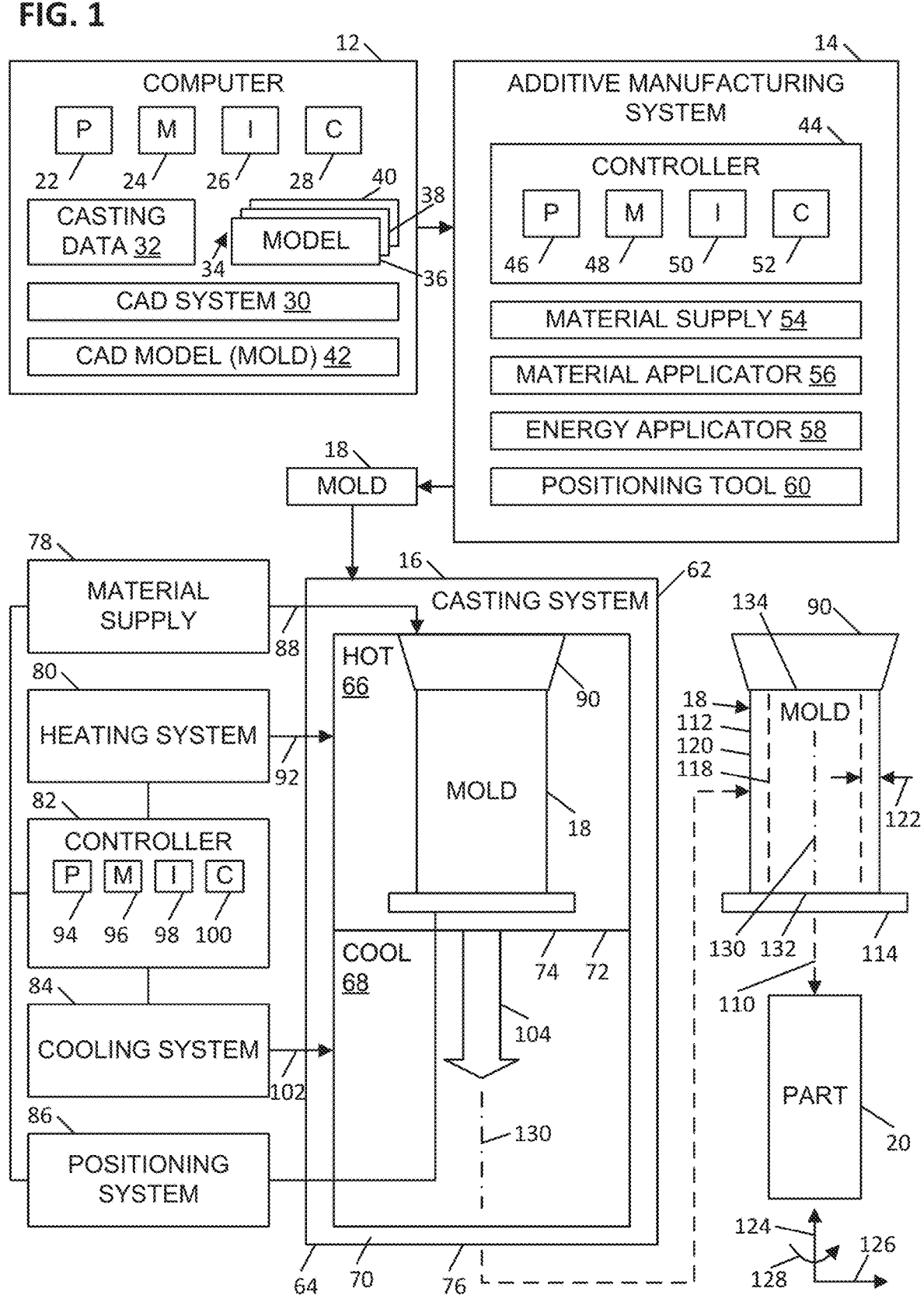
FIG. 1 is a block diagram of an embodiment of a manufacturing system to cast a part with a mold, wherein the mold has a variable wall thickness tailored to a variable thickness of the part.

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments include systems and methods for casting a part, such as a turbomachinery part, via a mold thermally tailored to the complex geometry and varying thickness of the part. In certain embodiments, the turbomachinery part may be part of a compressor, a turbine, a pump, or any combination thereof. For example, the turbine may include a gas turbine, a steam turbine, a hydro turbine, a wind turbine, or any combination thereof. The part may include a stationary part or a movable part, such as a rotary part. For example, the part may include a blade or vane of the turbomachinery, such as a gas turbine blade or vane. Accordingly, the part may substantially vary in thickness throughout the part. The disclosed embodiments generate a modified or enhanced mold using various computer models, historical data, casting data, and parts data to generate a mold that improves the heat transfer, cooling, and solidification profile for casting the part with the mold. For example, the mold may include variations in thickness that vary in an inverse or opposite manner to variations in thickness of the part, thereby providing thicker mold walls in thinner areas of the part and thinner mold walls in thicker areas of the part. In certain embodiment, the mold has a geometry, including variations in wall thickness, which is computer designed and manufactured via additive manufacturing to provide control over the heat transfer, cooling, and solidification. The resulting solidification profile may be a substantially flat solidification profile or concave down solidification profile. The concave down solidification profile would help to ensure that cooling and solidification progresses from the interior outward to the exterior during the casting process. The substantially flat solidification profile would help to ensure that cooling and solidification progresses in a generally uniform manner across both interior and exterior portions of the part during the casting process. The mold of the disclosed embodiments also may help to reduce casting grain defects, such as stray grains, misoriented grains, and freckles. The following discussion refers to the casting process for turbomachinery parts; however, the disclosed embodiments may be used for any parts in any industries.

FIG. 1 is a block diagram of an embodiment of a manufacturing system 10 configured to provide thermal improvements when manufacturing various equipment, such as components of turbomachinery. In the illustrated embodiment, the manufacturing system 10 includes a computer 12, an additive manufacturing system 14 (e.g., 3D printing system) coupled to the computer 12, and a casting system 16 configured to use a mold 18 produced by the additive manufacturing system 14 to cast a part 20. In certain embodiments, the part 20 may be a part of turbomachinery (e.g., a turbomachinery part), wherein the turbomachinery may include turbines, compressors, pumps, or other equipment. For example, the manufacturing system 10 may be configured to produce blades or vanes of the turbomachinery, such as turbine blades or vanes, compressor blades or vanes, pump blades or vanes, or a combination thereof, as the part 20. Accordingly, the manufacturing system 10 may be used for manufacturing parts 20, such as blades or vanes, of a gas turbine engine in a power plant.

As discussed in detail below, the manufacturing system 10 helps to improve the cooling and solidification profile of the part 20 during a casting process by tailoring the mold 18 to the part 20, wherein the tailoring specifically includes variations in thickness of the mold 18 tailored to variations in thickness of the part 20 to control the cooling and solidification profile. Although the disclosed embodiments primarily discuss variations in thickness to control the heat transfer (e.g., cooling) and solidification profile, the mold 18 may be generated based on variations in thermal conductivity, emissivity, alloy dependent latent heat of solidification, wall thickness, or any combination thereof. Additionally, the disclosed embodiments of the mold 18 are applicable for parts 20 having single crystal, directionally solidified columnar grain structure, equiaxed grain structure, or even hybrid grain structure casting. The hybrid grain structure casting may include directional solidification (DS) grain or single crystal grain at some locations and equiaxed grain at other locations of the part 20 cast with the mold 18. In certain embodiments, the mold 18 can be used with single mold casting or a tree of multiple molds for casting with the casting system 16.

The computer 12 may include one or more processors 22, memory 24, instructions 26 stored on the memory 24 and executable by the one or more processor 22 to perform various functions of a computer aided design (CAD) system 30, and communication circuitry 28 (e.g., wired and/or wireless communication circuitry) configured to communicate with the manufacturing system 14 and the casting system 16. The computer 12 further includes casting data 32, a plurality of models 34 such as models 36, 38, and 40, and various other data acquisition and processing equipment to facilitate operation of the CAD system 30. The CAD system 30 is configured to receive and process the casting data 32 and the plurality of models 34 to generate a CAD model 42 of a mold 18 for the part 20.

The casting data 32 and models 34 are used to help tailor the CAD model 42 of the mold 18, such that a desired heat transfer (e.g., cooling) and solidification (e.g., solidification profile) occurs during casting of the part 20. Accordingly, the casting data 32 may include historical casting data, simulated casting data (e.g., casting data using computer simulations), test casting data (e.g., casting data using test molds to obtain feedback), or any combination thereof. The casting data may include various inputs and outputs of the casting process, wherein the inputs may include the temperature of casting, the rate of movement of the mold 18 during casting, the materials used for casting, the geometry of the part 20, and the geometry of the mold 18. The outputs may include the temperature, solidification, and material properties of the part 20 resulting from the casting using the mold 18, wherein the outputs may include spatial profiles over time throughout the mold 18 and the part 20. In certain embodiments, for the test casting data, one or more test molds 18 may be modeled via the CAD model 42, produced by the additive manufacturing system 14, and tested by the casting system 16 to monitor the heat transfer (e.g., cooling) and solidification (e.g., solidification profile) for the part 20, such that the CAD model 42 of the mold 18 (and the mold 18 itself) can be further refined in any number of testing iterations.

The model 36 may include one or more computer simulated models of the part 20, the model 38 may include one or more computer simulated models of the part mold 18 and/or casting process, and the model 40 may include one or more computer simulated models of the turbomachinery (e.g., gas turbine engine). Each of the models 36, 38, and 40 may include one or more physics-based models, thermal or heat transfer models, solidification-based models, fluid-based models, existing or baseline CAD models, or any combination thereof. The thermal or heat transfer models may model the temperature, heat transfer, and solidification throughout the mold 18 and the part 20 to develop thermal profiles (e.g., temperature profile, heat transfer profile, cooling profile, etc.), solidification profiles (e.g., liquid/solid interface), or any combination thereof, at one or more cross-sections of the mold 18 and the part 20 during the casting process. For example, the models 36 and/or 38 may include models of the casting process, including the impact of variations in mold thickness on the temperature, cooling, solidification profile, material properties, and other characteristics of the part 20 being produced by the mold 18 in the casting process.

The CAD system 30 may be configured to generate the CAD model 42 of the part 20, such that the CAD model 42 has a variable thickness to adjust heat transfer and solidification of the part 20 during a casting process. For example, as discussed in further detail below, the CAD model 42 of the mold 18 may be tailed to the part 20 to include greater thicknesses to slow down heat transfer and solidification of the part 20 in thinner areas of the part 20, lesser thicknesses to speed up the heat transfer and solidification of the part 20 in thicker areas of the part 20, or a combination thereof. The variation in thickness of the CAD model 42 of the mold 18 may vary lengthwise along the part 20, crosswise throughout a cross-section of the part 20, or any combination thereof. Accordingly, the variation in thickness in the CAD mode 42 of the mold 18 is configured to help provide a desired heat transfer, cooling, and solidification of the part 20 during a casting process by the casting system 16.

The additive manufacturing system 14 is configured to use the CAD model 42 of the mold 18 to generate the mold 18 for use by the casting system 16. In the illustrated embodiment, the additive manufacturing system 14 includes a controller 44 having one or more processors 46, memory 48, instructions 50 stored on the memory 48 and executable by the processor 46 to execute a desired additive manufacturing process to generate the mold 18 according to the CAD model 42, and communication circuitry 52 (e.g., wired and/or wireless communication circuitry) configured to communicate with the computer 12 and the casting system 16. The additive manufacturing system 14 may be specifically designed to handle particular materials, such as a ceramic-specific additive manufacturing system 14. For example, the additive manufacturing system 14 may include an additive ceramic 3D printing system using the CAD model 42, such as a layer-by-layer sintering system configured to additively manufacturing the mold 18 with ceramic powders. In certain embodiments, the additive manufacturing system 14 may include a direct digital manufacturing (DDM) system using the CAD model 42.

The additive manufacturing system 14 also includes one or more material supplies 54, one or more material applicators 56, one or more energy applicators 58, and one or more positioning tools 60. The material supplies 54 may include gas supplies, liquid supplies, and solid supplies, such as solid powder supplies. The material supplies 54 may include plastic materials, metallic materials, ceramic materials, ceramic metal (e.g., cermet) materials, or any combination thereof. For example, in the illustrated embodiment, the additive manufacturing system 14 may use ceramic materials in the material supplies 54 to generate a ceramic mold 18. However, the materials may vary depending on the desired heat transfer through the mold 18 and the construction of the part 20. In certain embodiments, the ceramic materials may include silica, alumina, zircon, chromium oxide, aluminum silicate, silicon carbide, alumina-chromia-silica, or any combination or mixture thereof, configured to produce a corresponding ceramic mold 18. The material applicators 56 may include a layering applicator, a printer, a coating system, a sprayer, a jet or fluid nozzle, or any combination thereof. The energy applicator 58 may include one or more lasers, torches, or any other sources of high energy to create layers of the material from the material supply 54 via the material applicators 56. The positioning tool 60 may include electric drives, fluid drives (e.g., pneumatic and/or hydraulic drives), gear assemblies or transmissions, robotic arms, presses, conveyors, or any combination thereof. The positioning tool 60 may be configured to operate in one or more axes, such as X, Y, and Z axes, to provide three-dimensional movements of the material applicator 56, the energy applicator 58, or other equipment.

In operation, the additive manufacturing system 14 intakes the CAD model 42 of the mold 18 via the controller 44, and controls the material supply 54, the material applicator 56, the energy applicator 58, and the positioning tool 60 to provide or generate the mold 18 having variations in wall thickness according to the CAD model 42 of the mold 18. The end result of the additive manufacturing system 14 is the mold 18 with variations in thickness for subsequent use by the casting system 16. In certain embodiments, the manufacturing system 10 may use the CAD model 42 of the mold 18 with another type of manufacturing system 14, which may be configured to generate the mold 18 with variations in wall thickness according to the CAD model 42. Accordingly, the manufacturing system 10 is not limited to only the additive manufacturing system 14, the manufacturing system 10 and may use any suitable process to make the mold 18 with variable thicknesses to facilitate desired heat transfer and solidification profiles of the part 20.

The casting system 16 includes a furnace 62 having an enclosure 64, such as a thermally lined enclosure, which may include a hot chamber 66 and a cool chamber 68. The enclosure 64 may be lined with one or more layers of insulation 70, such as refractory bricks, ceramic materials, or any combination thereof. The casting system 16 also may include a divider or separating wall 72 between the hot chamber 66 and the cool chamber 68, wherein the separating wall 72 may include an opening 74 configured to enable passage of the mold 18 from the hot chamber 66 to the cool chamber 68. The furnace 62 also may include an access door 76 in the cool chamber 68 to facilitate removal of the mold 18 after completing a casting process. The casting system 16 also may be coupled to one or more of a material supply 78, a heating system 80, a controller 82, a cooling system 84, and a positioning system 86. In the illustrated embodiment, the material supply 78 may include one or more fluid supplies, solid supplies, or a combination thereof. For example, the material supply 78 may include a solid powder supply, which may include plastic powders, metallic powders, ceramic powders, cermet powders, or any other suitable powder materials. The material supply 78 may include a conduit or injection line 88 extending from the materials supply 78 to an upper funnel 90 of the mold 18. Thus, the material supply 78 is configured to route the desired materials into the mold 18 through the upper funnel 90, which may occur before or during heating of the mold 18 within the hot chamber 66 of the furnace 62.

The heating system 80 is configured to apply heat to the hot chamber 66 as indicated by arrow 92. The heating system 80 may include a combustion system, which combusts a fuel (e.g., a liquid, gaseous, or solid fuel) with an oxidant such as air. The heating system 80 is configured to apply sufficient heat 92 into the hot chamber 66 to maintain a desired temperature within the hot chamber 66 for melting or liquefying of the material supplied by the material supply 78 into the mold 18.

The controller 82 includes one or more processor 94, memory 96, instructions 98 stored on the memory 96 and executable by the processor 94 to facilitate monitoring and control of the material supply 78, the heating system 80, the cooling system 84, and the positioning system 86. The controller 82 also includes communication circuitry 100 configured to communicate via wired or wireless communication with the material supply 78, the heating system 80, the cooling system 84, and the positioning system 86 of the casting system 16, and also with the computer 12 and the additive manufacturing system 14. In operation, the controller 82 is configured to control the casting process of the part 20 using the mold 18 generated by the additive manufacturing system 14 based on the CAD model 42. In particular, the controller 82 may be configured to operate the casting system 16 with certain parameters associated with the CAD model 42, such as the temperatures in the hot chamber 66 and the cool chamber 68, the rate of movement of the mold 18 between the hot chamber 66 and the cool chamber 68, and other casting parameters.

The cooling system 84 is configured to apply cooling or heat transfer away from the cool chamber 68 as indicated by arrow 102. For example, the cooling system 84 may circulate a coolant to and from the cool chamber 68 to regulate a temperature within the cool chamber 68 when moving the mold 18 from the hot chamber 66 to the cool chamber 68, thereby controlling cooling of the mold 18 and solidification of the part 20. The cooling system 84 may include a gas cooling system, a liquid cooling system, or any combination thereof. For example, the cooling system 84 may circulate a cooled air, a cooled water, or another cooled thermal fluid to and from the cool chamber 68. In certain embodiments, the cooling system 84 may include one or more fans to circulate an air flow or an inert gas flow within the cool chamber 68 and/or between the cool chamber 68 and an external environment. However, using the mold 18 of the disclosed embodiments, the casting system 16 may be configured to operate without the cooling system 84, such as gas cooling or other high gradient casting techniques.

The positioning system 86 is configured to move the mold 18 in a controlled manner between the hot chamber 66 and the cool chamber 68, thereby helping to control the thermal profile and solidification profile of the part 20. For example, the positioning system 86 may include one or more electric drives, fluid drives (e.g., pneumatic drives and/or hydraulic drives), gear assemblies or transmissions, lifting assemblies, robotic arm assemblies, or any combination thereof. The positioning system 86 may be configured to move the mold in an axial direction 104 along a central axis 106 of the furnace 62, thereby controlling the rate of entry of the mold 18 into the cool chamber 68. In certain embodiments, the positioning system 86 also may be configured to rotate the mold 18 about the central axis 106, laterally move the mold 18 relative to the central axis 106, or any combination thereof. Each of the movements provided by the positioning system 86 may be configured to help control the thermal heat transfer away from the mold 18 and the part 20, the solidification profile of the part 20, or any combination thereof. The positioning system 86 also may be controlled by the controller 82 based at least in part on the variable thickness of the mold walls of the mold 18 to help control the heat transfer and solidification profile of the part 20.

Accordingly, in operation, the casting system 16 receives the material from the material supply 78 into the mold 18 through upper funnel 90, heats and liquefies the material within the mold 18 within the hot chamber 66, controls the temperature profile within the hot chamber 66 via the heating system 80, and controls movement of the mold 18 from the hot chamber 66 to the cool chamber 68 via the positioning system 86. As the mold 18 moves from the hot chamber 66 to the cool chamber 68, the cooling system 84 is controlled by the controller 82 to provide a desired temperature profile within the cool chamber 68, thereby helping to control the heat transfer away from the mold 18 and the cooling and solidification of the part 20 within the cool chamber 68. The variable wall thickness of the mold 18 and the rate of movement of the mold 18 from the hot chamber 66 to the cool chamber 68 helps control the heat transfer and solidification profile of the part 20 as discussed in further detail below. Once the mold 18 is moved from the hot chamber 66 to the cool chamber 68, the casting system 16 may continue to provide cooling to the cool chamber 68 until the mold 18 and the part 20 are sufficiently cooled and the part 20 is solidified. At this point, the casting system 16 may open the access door 76 to permit removal of the mold 18 as indicated by arrow 108. The part 20 may then be removed from the mold 18 as indicated by arrow 110.

In the illustrated embodiment, the mold 18 has a mold body 112 disposed between the upper funnel 90 and a lower thermal plate or starter block 114. As discussed above, the upper funnel 90 is configured to help direct the material from the material supply 78 into the mold body 112. The thermal plate 114 is configured to help transfer heat away from the mold body 112 during the cooling and solidification process for the part 20. As discussed in further detail below, the mold body 112 has a wall 116 disposed about an interior or casting chamber 118. The wall 116 surrounds the interior 118, while an exterior 120 is disposed about the wall 116. The wall 116 also has a wall thickness 122 that varies in various directions to provide more uniform cooling and solidification of the part 20, wherein the wall thickness 122 is based on the CAD model 42 of the mold 18 as discussed above.

In the illustrated embodiment, the wall thickness 122 may vary in one or more of an axial direction 124, a radial direction 126 generally perpendicular to the axial direction 124, and a circumferential direction 128 disposed about the axial direction 124 relative to a central axis 130 of the mold 18. For example, at a particular axial position along the central axis 130, the wall thickness 122 may vary throughout a cross-sectional plane of the mold 18. Additionally, in the axial direction 124 along the central axis 130, the wall thickness 122 may vary between the upper funnel 90 and the thermal plate 114. In certain embodiments, the thermal plate 114 may be disposed toward a tip portion 132 of the part 20 and the funnel 90 may be disposed adjacent a base portion 134 of the part 20 being cast by the casting system 16. However, the orientation of the part 20 may vary depending on the particular part and application. Additional details of the mold 18 and the casting process are discussed in further detail below.

Figure 2:
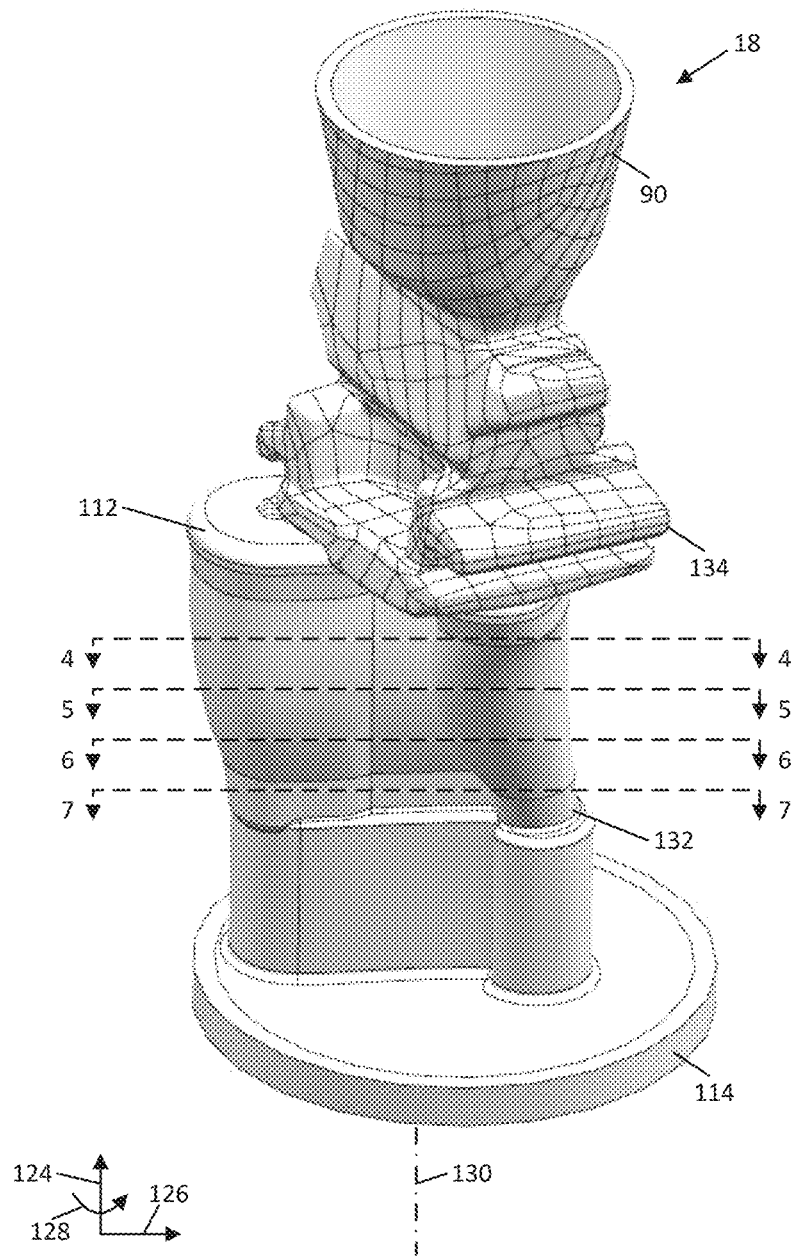
FIG. 2 is a perspective view of an embodiment of the mold used to cast the part by the manufacturing system of FIG. 1.

FIG. 2 is a perspective view of an embodiment of the mold 18 used to cast the part 20 by the manufacturing system 10 of FIG. 1. As illustrated, the mold 18 includes the mold body 112 disposed between the upper funnel 90 and the thermal plate 114. The mold also includes the tip portion 132 adjacent the thermal plate 114 and the base portion 134 adjacent the upper funnel 90. As illustrated in FIG. 2, the geometry of the mold body 112 varies between the upper funnel 90 and the thermal plate 114. More specifically, the mold body 112 has variations in the wall thickness 122 at various cross-sectional areas along the central axis 130 of the mold 18. For example, the wall thickness 122 varies at each of the cross-sectional areas at planes taken through the mold 18 as indicated by line 4-4, line 5-5, line 6-6, and line 7-7. As discussed in further detail below, the wall thickness 122 varies across the cross-sectional areas of the planes, and the wall thickness 122 varies in the axial direction 124 along the central axis 130.

Figure 3:
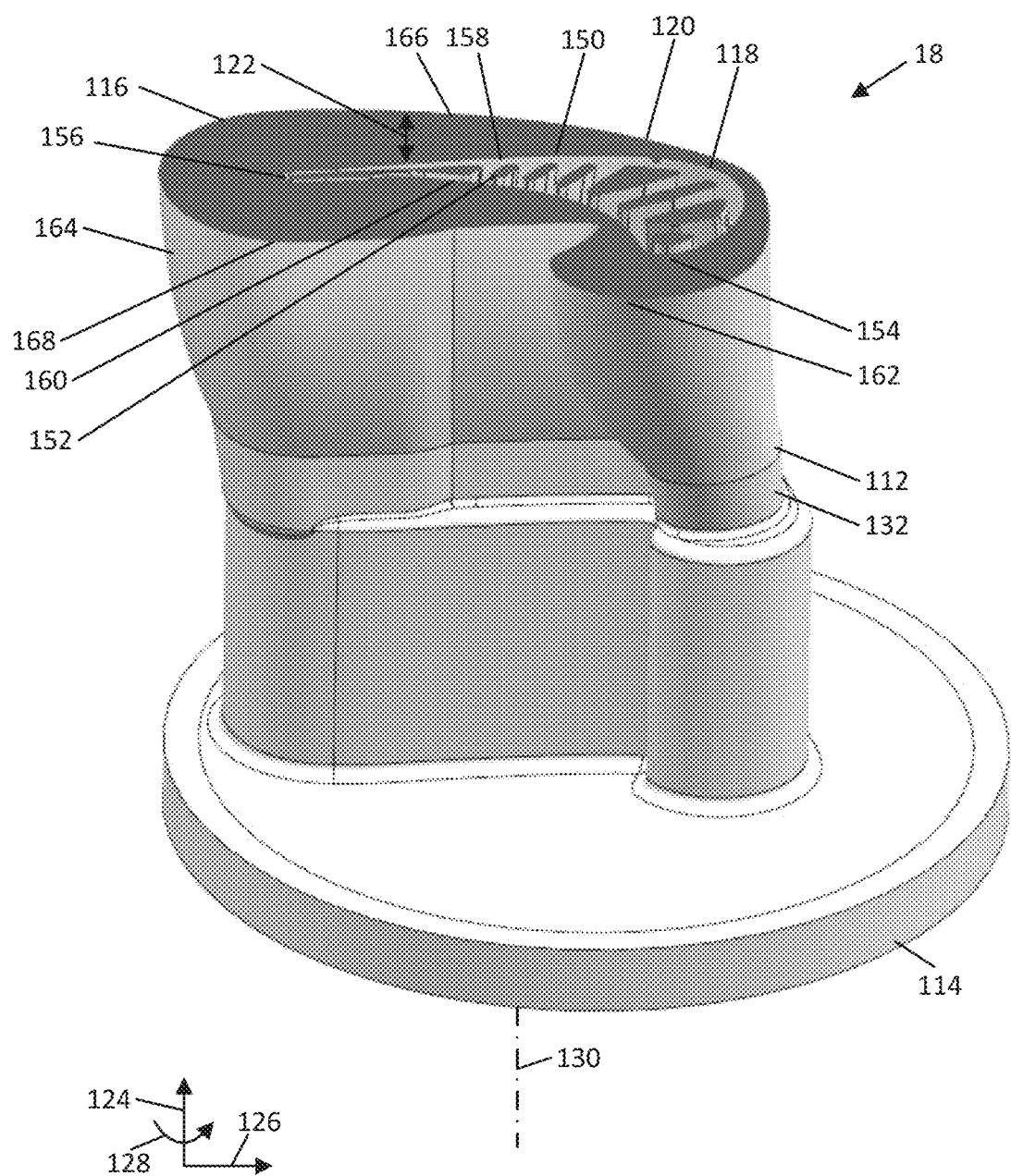
FIG. 3 is a cut-away perspective view of an embodiment of the mold of FIGS. 1 and 2, further illustrating interior details of the mold body.
Figure 4:
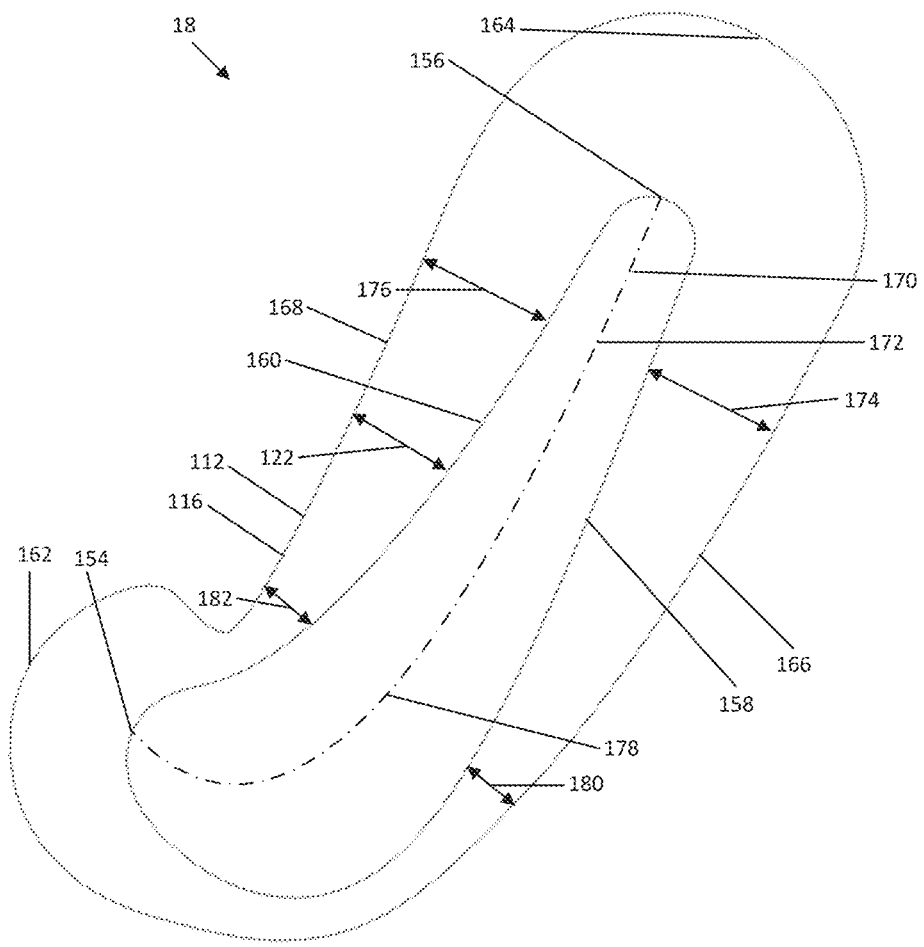
FIG. 4 is a cross-sectional view of an embodiment of the mold of FIGS. 1-3, as taken along line 4-4 of FIG. 2, illustrating variations in the wall thickness of the mold.
Figure 5:
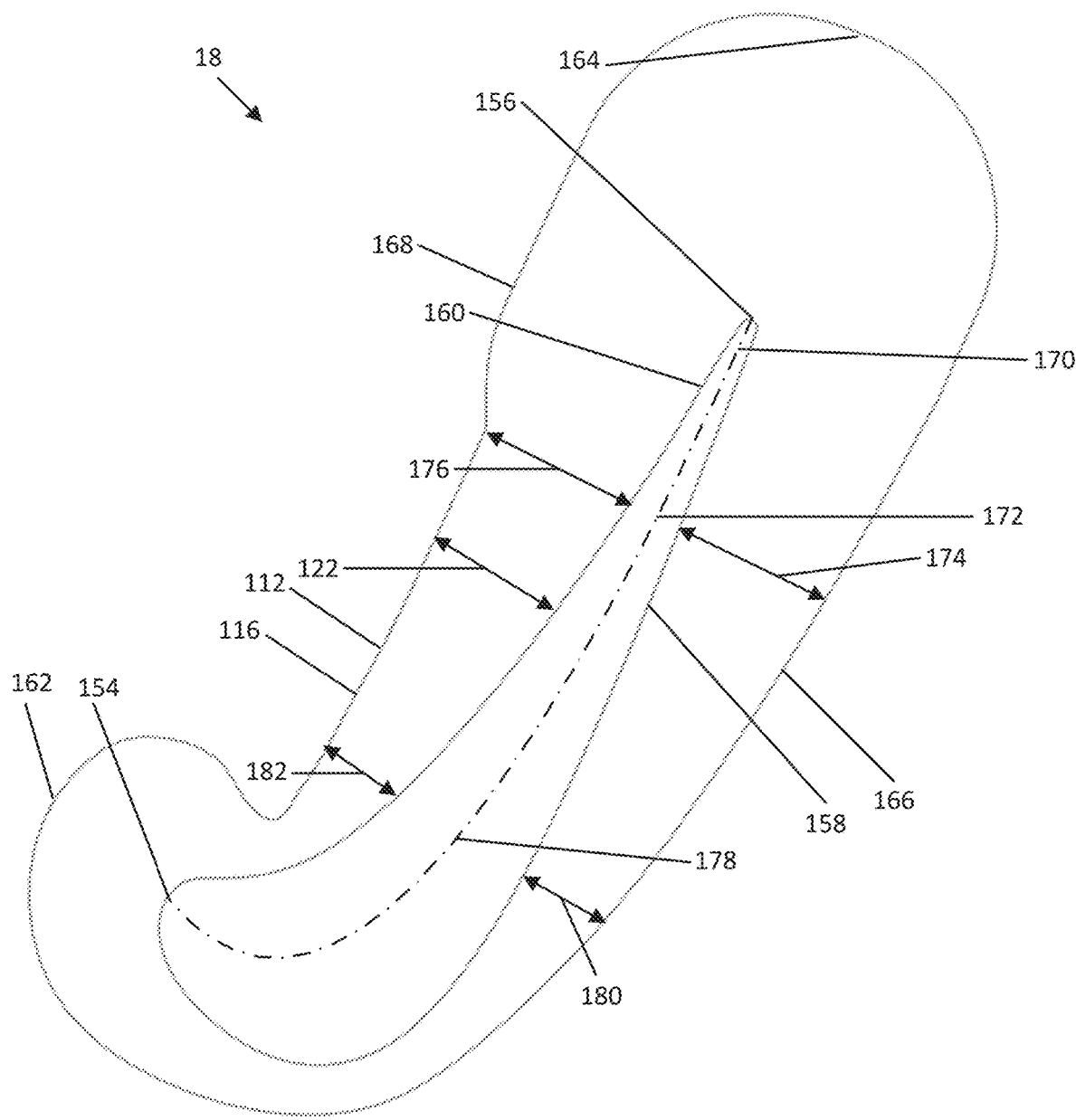
FIG. 5 is a cross-sectional view of an embodiment of the mold of FIGS. 1-3, as taken along line 5-5 of FIG. 2, illustrating variations in the wall thickness of the mold.
Figure 6:
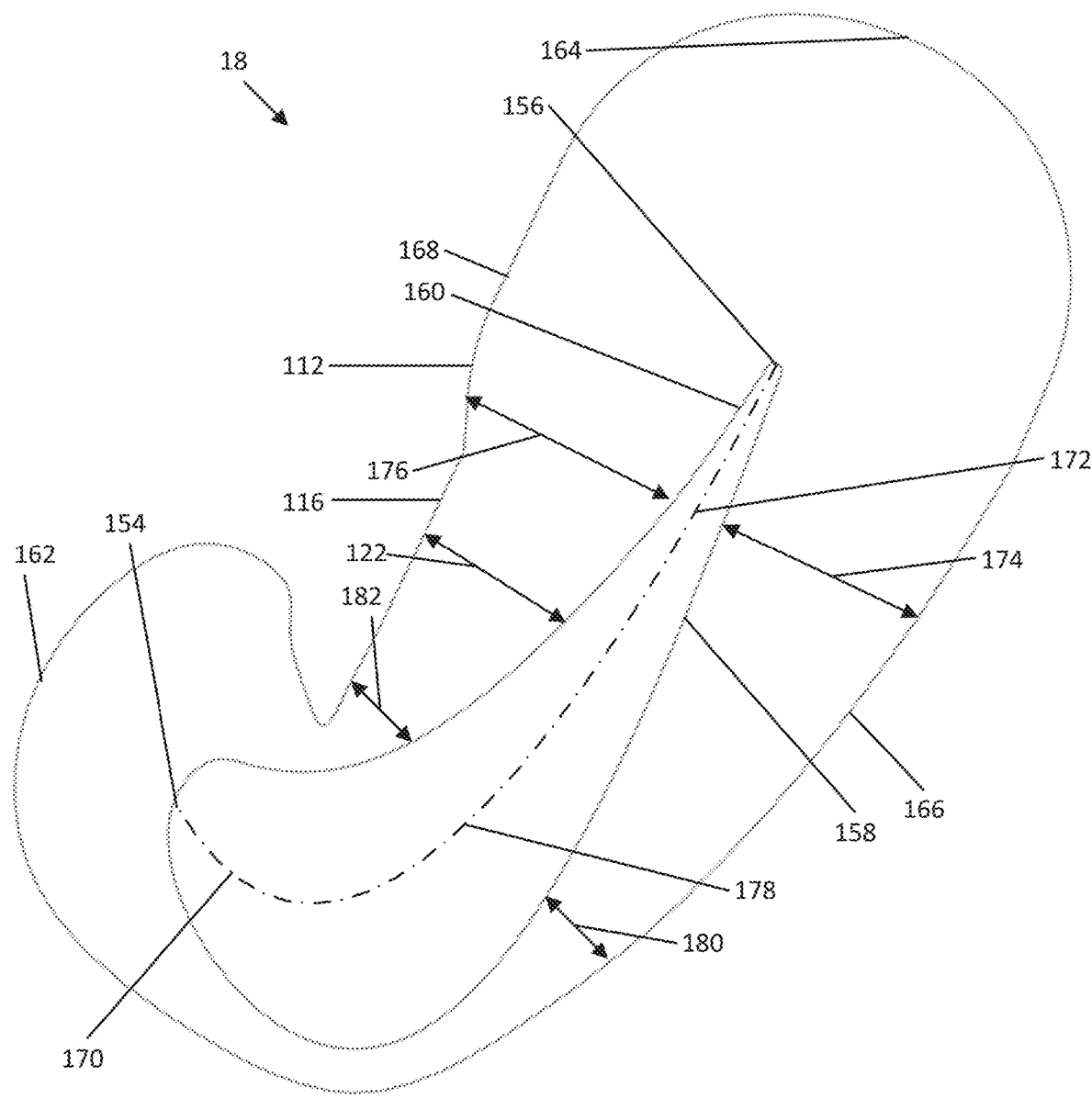
FIG. 6 is a cross-sectional view of an embodiment of the mold of FIGS. 1-3, as taken along line 6-6 of FIG. 2, illustrating variations in the wall thickness of the mold.
Figure 7:
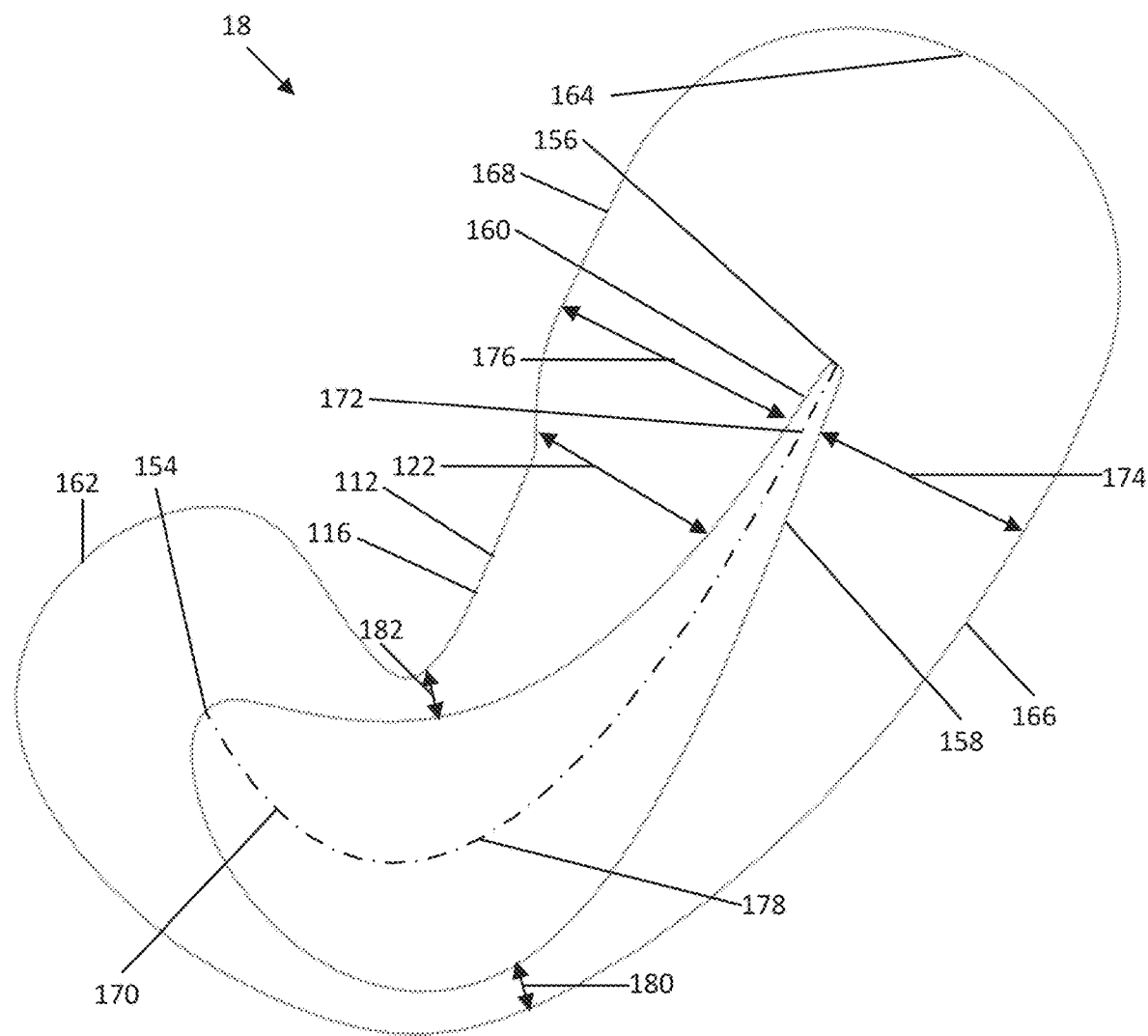
FIG. 7 is a cross-sectional view of an embodiment of the mold of FIGS. 1-3, as taken along line 7-7 of FIG. 2, illustrating variations in the wall thickness of the mold.

FIG. 3 is a cut-away perspective view of an embodiment of the mold 18 of FIGS. 1 and 2, further illustrating interior details of the mold body 112. In the illustrated embodiment, the mold 18 may be configured to produce the part 20 with an airfoil shaped geometry, such as an airfoil shaped blade or vane of a turbine, a compressor, or other turbomachinery. Accordingly, the mold body 112 includes an airfoil shaped cavity 150 having a plurality of interior portions 152 configured to provide hollow portions of the part 20 upon completion of the casting process. Accordingly, the airfoil shaped cavity 150 has the interior 118 with an airfoil shaped interior profile, while the exterior 120 also has an airfoil shaped exterior profile separated from the interior 118 by the wall thickness 122. Again, the wall thickness 122 varies about the airfoil shaped cavity 150 to facilitate desired heat transfer and solidification profiles of the part 20.

The airfoil shaped cavity 150 extends from a leading edge 154 to a trailing edge 156, wherein the leading and trailing edges 156 and 154 are joined by a suction side 158 and a pressure side 160 of the interior 118. The foregoing geometry of the airfoil shaped cavity 150 defines the exterior of the part 20 upon completion of the casting process. The exterior 120 of the mold body 112 generally follows the contours of the airfoil shaped cavity 150 (albeit with the variable wall thickness 122), wherein the exterior 120 has a leading edge portion 162, a trailing edge portion 164, a suction side portion 166, and a pressure side portion 168 generally along or aligned with the leading edge 154, the trailing edge 156, the suction side 158, and the pressure side 160 of the interior 118. However, the wall thickness 122 of the wall 116 varies around the airfoil shaped cavity 150 from the leading edge 154 to the trailing edge 156, and thus the wall thickness 122 of the wall 116 also varies around the exterior 120 from the leading edge portion 162 to the trailing edge portion 164. Additionally, the wall thickness 122 may vary in the axial direction 124 along the central axis 130 of the mold 118 as noted above.

In certain embodiments, the portions of the airfoil shaped cavity 150 defining thinner portions of the part 20 may be surrounded by thicker portions of the wall 116 (e.g., greater wall thicknesses 122), while the portions of the airfoil shaped cavity 150 defining thicker portions of the part 20 may be surrounded by thinner portions of the wall 116 (e.g., lesser wall thicknesses 122). In other words, the thinner portions of the part 20 being formed by the mold 18 are likely to cool and solidify faster than thicker portions of the part 20 being formed by the mold 18, and thus the mold 18 is tailored to these variations in thicknesses and solidification rates in the part 20 by providing greater wall thicknesses 122 to slow the cooling and solidification in the thinner portions of the part 20 and by providing lesser wall thicknesses 122 to speed the cooling and solidification in the thicker portions of the part 20. In this manner, the mold 18 tailoring is provided by varying the wall thickness 122 of the mold 18 in an inverse or opposite manner to the variations in thickness of the part 20 being cast in the mold 18. The variation in wall thickness 122 may be based on the variations in thickness of the part 20, the variation in cooling throughout the part 20, the variations in solidification throughout the part 20, or any combination thereof, to help provide the desired cooling and solidification of the part 20 during the casting process.

FIGS. 4, 5, 6, and 7 are cross-sectional views of an embodiment of the mold 18 of FIGS. 1-3, as taken along line 4-4, line 5-5, line 6-6, and line 7-7 of FIG. 2, respectively. The cross-sectional views of FIGS. 4, 5, 6, and 7 illustrate variations in the wall thickness 122 at different axial positions along the central axis 130, while also showing variations in the wall thickness 122 between the leading and trailing edges 154 and 156. In particular, as illustrated in each of the cross-sectional views, the wall thickness 122 of the wall 116 is generally thicker at the trailing edge portion 164 of the mold body 112 and generally thinner at the leading edge portion 162 of the mold body 112, which corresponds to a generally thinner portion of the airfoil shaped cavity 150 at the trailing edge 156 and a generally larger cavity portion of the airfoil shaped cavity 150 at the leading edge 154. Accordingly, the thickness 122 is generally greater for thinner areas of the airfoil shaped cavity 150 (and the part 20), and the thickness 122 is generally thinner for the thicker areas of the airfoil shaped cavity 150 (and the part 20).

As illustrated in FIGS. 4, 5, 6, and 7, a centerline or camber line 170 extends from the leading edge 154 to the trailing edge 156 of the airfoil shaped cavity 150, wherein the camber line 170 is midway or centered between the suction side 158 and the pressure side 160. Along the camber line 170, the wall thickness 122 of the wall 116 may be substantially equal on both the suction side portion 166 and the pressure side portion 168 of the mold body 112 at each location along the camber line 170. In this manner, the wall thickness on both the suction and pressure side portions 166 and 168 is equal or uniform at each location along the camber line 170 to help provide uniform heat transfer at each location along the camber line 170 (e.g., in opposite directions relative to the camber line 170 toward the suction and pressure side portions 166 and 168), thereby helping to provide a desired cooling profile and solidification profile for the part 20. However, as the mold body 112 extends along the camber line 170, the wall thickness 122 generally varies between the leading edge portion 162 and the trailing edge portion 164 of the mold body 112 depending on the thickness of the airfoil shaped cavity 150 (and thus the part 20). The variation in the wall thickness 122 is configured to help provide more uniform heat transfer and cooling during the casting process within the casting system 16, while also helping to provide more uniform solidification of the liquefied material within the mold 18 to form the part 20.

As an example, at a point 172 along the camber line 170, the wall thickness 122 may be equal at segments 174 and 176 corresponding to the suction side portion 166 and the pressure side portion 168 of the mold body 112. Similarly, at a point 178 along the camber line 170, the wall thickness 122 of the wall 116 may be substantially equal at segments 180 and 182 corresponding to the suction side portion 166 and the pressure side portion 168 of the mold body 112. However, when comparing the points 172 and 178, the wall thickness 122 varies between the pair of segments 174 and 176 and the pair of segments 180 and 182. The wall thickness 122 may have similar variations in other points along the camber line 170, thereby providing variations in the wall thickness 122 to provide the desired heat transfer depending on the thickness of the airfoil shaped cavity 150 and the desired solidification profile for casting the part 20.

Figure 8:
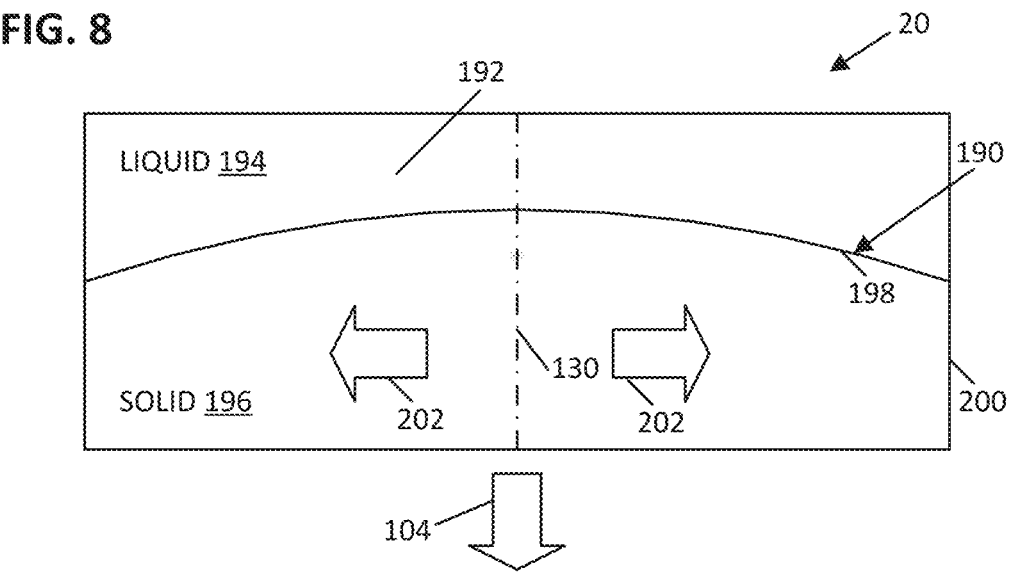
FIG. 8 is a schematic view of an embodiment of a solidification profile (e.g., a concave down solidification profile) for a material of the part transitioning from a liquid state to a solid state in the mold during cooling in the casting system of FIG. 1.
Figure 9:
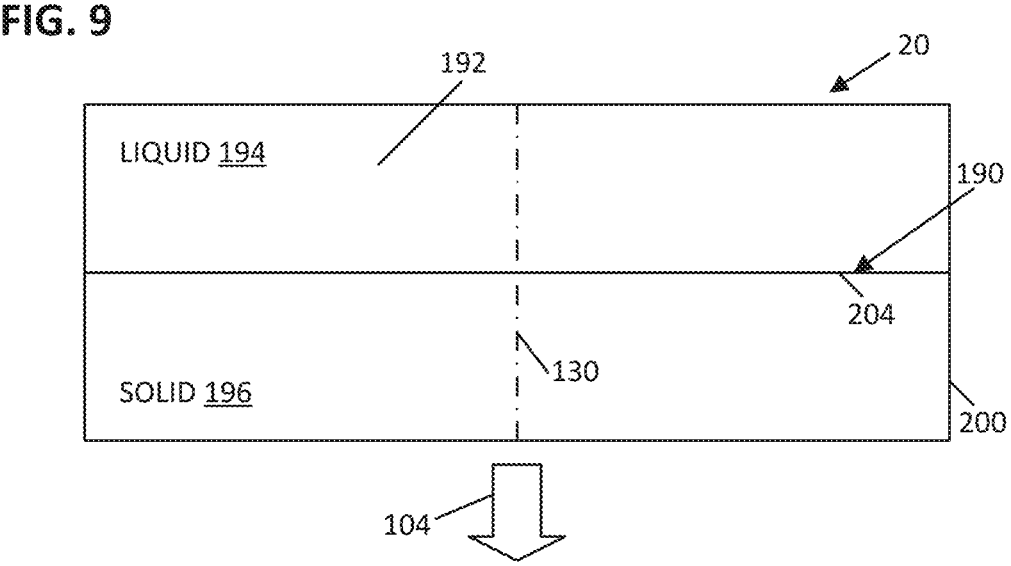
FIG. 9 is a schematic view of an embodiment of a solidification profile (e.g., a flat solidification profile) for a material of the part transitioning from a liquid state to a solid state in the mold during cooling in the casting system of FIG. 1.

FIGS. 8 and 9 are schematic views of embodiments of solidification profiles 190 for a material 192 of the part 20 transitioning from a liquid state 194 to a solid state 196 in the mold 18 during cooling in the casting system 16 of FIG. 1. As illustrated in FIG. 8, the solidification profile 190 has a concave down solidification profile 198, wherein the liquid state 194 transitions to the solid state 196 of the material 198 from a central axis 130 outward toward an outer perimeter 200 of the part 20 during the cooling process in the casting system 16. In particular, the concave down solidification profile 198 is achieved with variations in the wall thickness 122 of the mold 18 and rates of movement of the mold 18 from the hot chamber 66 to the cool chamber 68 of the casting system 16, such that the part 20 cools and solidifies from the inside out as indicated by arrows 202. The part 20 undergoes this solidification profile 190 (e.g., the concave down solidification profile 198) during movement of the mold 18 from the hot chamber 66 to the cool chamber 68 as indicated by arrow 104.

However, in certain embodiments, the solidification profile 190 may have another solidification profile, such as a flat or substantially flat solidification profile 204 as illustrated in FIG. 9. In the embodiment of FIG. 9, the flat solidification profile 204 may be achieved by controlling the variable wall thickness 122 of the mold 18 and the rate of movement of the mold 18 between the hot chamber 66 and the cool chamber 68 as indicated by arrow 104, thereby enabling the material 192 to transition from the liquid state 194 to the solid state 196 in a generally uniform manner between the central axis 130 and the outer perimeter 200. The manufacturing system 10 of FIG. 1 may be configured to achieve either the concave down solidification profile 198 or the flat solidification profile 204 via control of the mold geometry via the CAD model 42 produced by the computer 12, the mold 18 produced by the additive manufacturing system 14, and various controls of the casting system 16.

Figure 10:
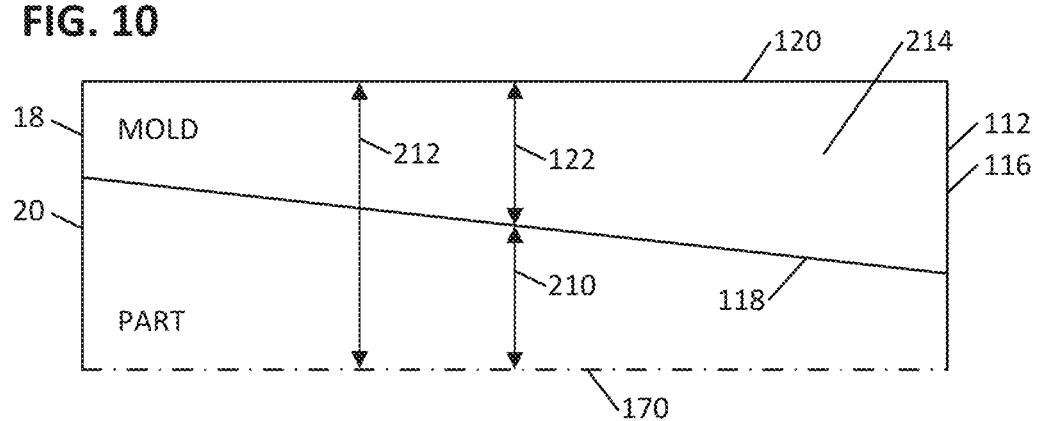
FIG. 10 is a schematic partial cross-sectional view of an embodiment of the mold of FIGS. 1-7, further illustrating variations in thickness of the part and the mold body.
Figure 11:
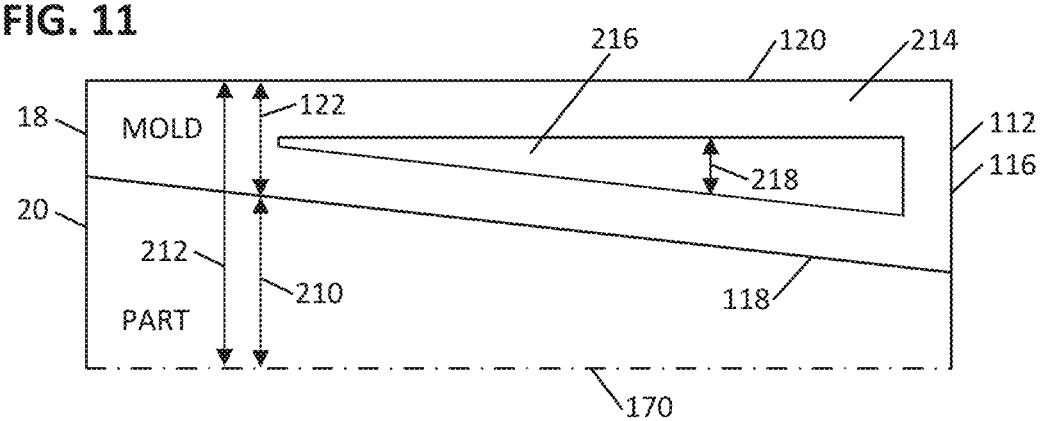
FIG. 11 is a schematic partial cross-sectional view of an embodiment of the mold of FIGS. 1-7, further illustrating variations in thickness of the part and the mold body.

FIGS. 10 and 11 are schematic partial cross-sectional views of embodiments of the mold 18 of FIGS. 1-7, further illustrating variations in thickness of the part 20 and the mold body 112. As illustrated in FIGS. 10 and 11, the wall 116 of the mold body 112 generally varies in the wall thickness 122 at various locations lengthwise along the centerline or camber line 170 between the interior 118 and the exterior 120. Similarly, the thickness 210 of the part 20 generally varies lengthwise along the centerline or camber line 170 between the interior 118 of the mold 18 and the camber line 170. As appreciated, the thickness 210 as shown in FIGS. 10 and 11 may be one-half of the entire thickness of the part 20, such that the thickness 210 is equal on both sides of the camber line 170. Similarly, the thickness 122 of the wall 116 of the mold body 112 may be substantially equal on both sides of the camber line 170, depending on the particular part being constructed. However, as illustrated in FIG. 10, the thickness 122 generally increases while the thickness 210 decreases along the camber line 170, while the thickness 122 generally decreases while the thickness 210 generally increases along the camber line 170. In other words, the thicknesses 122 and 210 may vary in an inverse or opposite manner (e.g., inversely proportional) relative to one another, such that an overall thickness 212 may control the overall heat transfer and solidification profile during cooling of the mold 18 and the part 20 in the casting system 16. In certain embodiments, the total thickness 212 may be substantially uniform along the camber line 170. However, in certain embodiments, the total thickness 212 may also vary (e.g., increase or decrease) along the camber line 170, thereby helping to control the cooling and solidification profile to achieve the desired solidification profile 190 as discussed above with reference to FIGS. 8 and 9.

In the embodiment of FIG. 10, the wall 116 of the mold 18 may have a solid wall construction made of a suitable material to facilitate or control the heat transfer. For example, a material 214 of the mold 18 may include a ceramic material, a metallic material, a plastic material, a composite material, a ceramic metal material, or any combination thereof. For example, a ceramic material may be used for the material 214 of the mold 18 to control the heat transfer, cooling, and solidification profile 190 of the part 20.

In the embodiment of FIG. 11, the wall 116 of the mold 18 may have a partially hollow construction, wherein a hollow chamber 216 is disposed in the mold body 112 of the mold 18. For example, the hollow chamber 216 may be configured to further control the heat transfer lengthwise along the camber line 170. The hollow chamber 216 may have a thickness 218 which is constant or varies lengthwise along the camber line 170. For example, the thickness 218 of the hollow chamber 216 may generally decrease with a decrease in the wall thickness 122 and/or increase with an increase in the wall thickness 122 along the camber line 170. In certain embodiments, the wall 116 of the mold 18 may include a plurality of hollow chambers 216 to define a honeycomb structure, the wall 116 of the mold 18 may include a multi-wall structure having a plurality of walls separated by the hollow chamber 216, or a combination thereof. Additionally, the hollow chamber 216 may be empty, in vacuum, filled with a liquid or gas (e.g., inert gas), or filled with a different material (e.g., insulating material). However, any suitable arrangement, number, geometry, or construction of the hollow chamber 216 may be disposed within the wall 116 of the mold body 112 to help control the heat transfer and solidification profile of the part 20.

Figure 12:
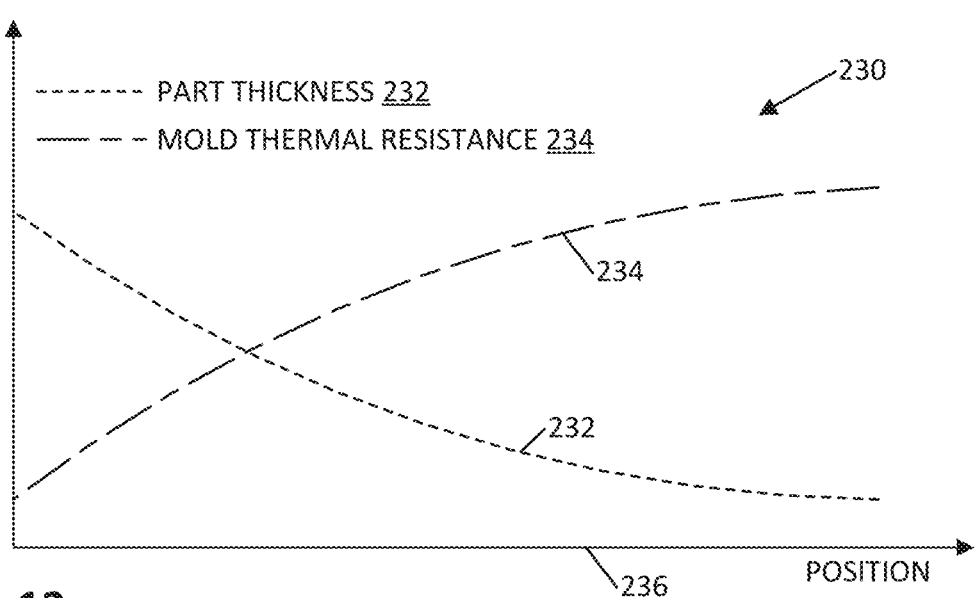
FIG. 12 is a graph of an embodiment of a relationship between a part thickness of the part and a mold thermal resistance of the mold of FIGS. 1-7.

FIG. 12 is a graph 230 of an embodiment of a relationship between a part thickness 232 and a mold thermal resistance 234 relative to a position 236 along the mold 18 and the part 20, such as along the camber line 170. As illustrated in FIG. 12, the part thickness 232 and the mold thermal resistance 234 vary in an inverse or opposite manner (e.g., inversely proportional) relative to one another in response to changes in the position 236 along the mold 18 (e.g., along the camber line 170 and/or along the central axis 130).

For example, the part thickness 232 generally decreases in response to changes in the position 236, while the mold thermal resistance 234 generally increases in response to changes in the position 236, or vice versa. In other words, for thicker areas of the part 20 as depicted by the part thickness 232, the mold 18 may be designed, constructed, and used with a relatively thinner thickness as depicted by the mold thermal resistance 234. The thinner wall thickness 122 helps reduce the mold thermal resistance 234, thereby helping to increase the heat transfer, cooling, and solidification rate in the thicker areas of the part 20. Conversely, for thinner areas of the part 20 as indicated by the part thickness 232, the mold 18 may be designed, constructed, and used with a greater wall thickness 122 and corresponding mold thermal resistance 234. The greater wall thickness 122 and mold thermal resistance 234 helps to slow or reduce the heat transfer, cooling, and solidification rate of the thinner areas of the part 20, such that the thinner areas of the part 20 do not solidify substantially faster than the thicker part areas of the part 20. In this manner, the variable wall thickness 122 of the mold 18 helps to control the mold thermal resistance 234 depending on the thickness of the part 20, thereby helping to achieve the desired solidification profiles 190, such as discussed above with reference to FIGS. 8 and 9.

FIG. 13 is a flow chart of an embodiment of a manufacturing process 250 for casting the part 20 with the mold 18 having a variable wall thickness 122 tailored to the part 20 as discussed in detail above. In the illustrated embodiment, the process 250 includes receiving a component model of a component to be cast in a mold as indicated by block 252. The component model may correspond to the model 36 of the part 20, which may include a turbomachinery part (e.g., vane or blade of a turbine, compressor, or pump). The process 250 also may including receiving other models, such as the models 38 and 40. The process 250 further includes receiving casting data as indicated by block 254. As discussed above, the casting data 32 may include historical casting data, simulated casting data (e.g., casting data using computer simulations), test casting data (e.g., casting data using test molds to obtain feedback), material data, temperature data, solidification data, operational parameters of the casting system 16 for casting the part 20 using the mold 18, or any combination thereof. The process 250 may then proceed to generate a mold model with a varying thermal resistance based on a varying thickness and/or solidification rate throughout a geometry of the component as indicated by block 256. The mold model may correspond to the CAD model 42 of the mold 18 as discussed above. The varying thermal resistance may be achieved by varying the wall thickness 122 of the wall 116 of the mold body 112 as discussed above, thereby helping to achieve a solidification profile 190 such as discussed above with reference to FIGS. 8 and 9.

The process 250 may then proceed to fabricate the mold based on the mold model via a suitable manufacturing process, such as additive manufacturing, as indicated by block 258. For example, the process 250 may use the additive manufacturing system 14 to generate the mold 18 having a variable wall thickness 122 as discussed in detail above. The process 250 may then proceed to insert the mold into a casting system as indicated by block 260. For example, the mold 18 may be inserted into the hot chamber 66 of the furnace 62 of the casting system 16. The process 250 may then proceed to supply and liquefy a material in the mold in a hot chamber of the casting system as indicated by block 262. For example, the material supply 78 may route a material into the mold 18 via the upper funnel 90, such that the material liquefies while the mold 18 is disposed in the hot chamber 66 of the furnace 62. The process 250 may then proceed to move the mold from a hot chamber to a cool chamber of the casting system as indicated by block 264. For example, the mold 18 may be moved by the positioning system 86 of the casting system 16 from the hot chamber 66 to the cool chamber 68, wherein the positioning system 86 is controlled by the controller 82 to control the rate of movement of the mold 18 as indicated by arrow 104.

The process 20 is configured to control the solidification of the liquefied material via the mold movement and varying thermal resistance of the mold as indicated by block 266. For example, the controller 82 may control the positioning system 86 to control the rate of movement of the mold 18, such that the liquefied material gradually cools and solidifies as the mold 18 moves into the cool chamber 68. Additionally, the varying thermal resistance of the mold 18 may be achieved by the varying wall thickness 122 of the wall 116 of the mold body 112. The process 250 may then proceed to remove the cast component from the mold as indicated by block 268. For example, the mold 18 may be removed from the furnace 62 through the access door 76. At this point, the part 20 may be removed from the mold 18 for final inspection and processing.

Technical effects of the disclosed embodiments may include a tailored mold 18 with a varying wall thickness 122 configured to control the heat transfer (e.g., cooling), solidification, and material properties associated with casting of the part 20, which may include a turbomachinery part. The varying wall thickness 122 may generally increase for thinner portions of the part 20 and decrease for relatively thicker portions of the part 20. Accordingly, the varying wall thickness 122 helps to slow down cooling and solidification for portions of the part 20 that would otherwise cool and solidify too fast, while speeding up the cooling and solidification for portions of the part 20 that would otherwise cool and solidify too slowly. The particular geometry and dimensions of the varying wall thickness 122 may be achieved through the CAD system 30 using various casting data 32 and models 34. The additive manufacturing system 14 may then be used to generate the mold 18 having the varying wall thickness 122, such as by additively manufacturing the mold 18 in various layers to generate the complex geometry of the mold 18. In operation, the varying wall thickness 122 may vary in an axial direction 124, a radial direction 126, and/or a circumferential direction 128 relative to a central axis 130 of the mold 18 and the part 20. Advantageously, the varying wall thickness 122 of the mold 18 helps to control the solidification profile 190, such that a concave down solidification profile 198 or a flat solidification profile 204 can be achieved for the solidification of the part 20 in the casting system 16.

The subject matter described in detail above may be defined by one or more clauses, as set forth below.

In certain embodiments, a system includes a controller configured to receive a computer model of a mold configured to cast a part, wherein the computer model has a variable wall thickness of the mold thermally tailored to a geometry of the part. The controller is configured to control a manufacturing system to produce the mold based on the computer model.

The system of the preceding clause, wherein the variable wall thickness of the mold is designed to provide a desired solidification profile of the part during a casting process.

The system of any preceding clause, wherein the solidification profile includes a concave down solidification profile or a substantially flat solidification profile. The concave down solidification profile is configured solidify material from a liquid state to a solid state in an outward direction from an interior to an exterior of the part during the casting process. The substantially flat solidification profile is configured solidify the material from the liquid state to the solid state in a substantially uniform manner in the interior and exterior of the part during the casting process.

The system of any preceding clause, wherein the part varies in thickness between a first end and a second end, wherein the variable wall thickness of the mold varies in an inverse manner relative to the thickness of the part.

The system of any preceding clause, wherein the mold includes a turbomachinery part mold and the part includes a turbomachinery part.

The system of any preceding clause, wherein the turbomachinery part includes an airfoil shaped blade or an airfoil shaped vane of a gas turbine system.

The system of any preceding clause, wherein the turbomachinery part varies in thickness between a leading edge and a trailing edge, wherein the variable wall thickness of the mold varies in an inverse manner relative to the thickness of the turbomachine part between the leading edge and the trailing edge.

The system of any preceding clause, wherein the turbomachinery part includes a suction side and a pressure side on opposite sides of a camber line between the leading edge and the trailing edge. The variable wall thickness includes a first variable thickness between an interior and a suction side portion of the mold, wherein the variable wall thickness includes a second variable thickness between the interior and a pressure side portion of the mold. The first and second variable thicknesses vary along the camber line, wherein, for each point along the camber line, the first and second variable thicknesses are equal to another along lines perpendicular to the respective suction and pressure side portions of the mold.

The system of any preceding clause, wherein the computer model of the mold includes a computer aided design (CAD) model of the mold based at least in part on casting data and one or more models relating to the part.

The system of any preceding clause, wherein the manufacturing system includes an additive manufacturing system.

The system of any preceding clause, including the additive manufacturing system coupled to the controller.

The system of any preceding clause, wherein the controller is configured to control a casting system to cast the part using the mold.

The system of any preceding clause, including the casting system coupled to the controller, wherein the casting system includes a furnace having a hot chamber and a cold chamber, wherein the controller is configured to control movement of the mold from the hot chamber to the cold chamber.

The system of any preceding clause, including the mold produced by the manufacturing system, the part produced by a casting system, or a combination thereof, based on the computer model of the mold.

In certain embodiments, a method includes receiving, via a controller, a computer model of a mold configured to cast a part, wherein the computer model has a variable wall thickness of the mold thermally tailored to a geometry of the part. The method also includes controlling, via the controller, a manufacturing system to produce the mold based on the computer model.

The method of the preceding clause, wherein the variable wall thickness of the mold is designed to provide a desired solidification profile of the part during a casting process, wherein the solidification profile includes a concave down solidification profile or a substantially flat solidification profile. The concave down solidification profile is configured solidify material from a liquid state to a solid state in an outward direction from an interior to an exterior of the part during the casting process. The substantially flat solidification profile is configured solidify the material from the liquid state to the solid state in a substantially uniform manner in the interior and exterior of the part during the casting process.

The method of any preceding clause, wherein the mold includes a turbomachinery part mold and the part includes a turbomachinery part. The turbomachinery part includes an airfoil shaped blade or an airfoil shaped vane of a gas turbine system. The turbomachinery part varies in thickness between a leading edge and a trailing edge, wherein the variable wall thickness of the mold varies in an inverse manner relative to the thickness of the turbomachine part between the leading edge and the trailing edge. The turbomachinery part includes a suction side and a pressure side on opposite sides of a camber line between the leading edge and the trailing edge. The variable wall thickness includes a first variable thickness between an interior and a suction side portion of the mold, wherein the variable wall thickness includes a second variable thickness between the interior and a pressure side portion of the mold. The first and second variable thicknesses vary along the camber line, wherein, for each point along the camber line, the first and second variable thicknesses are equal to another along lines perpendicular to the respective suction and pressure side portions of the mold.

In certain embodiments, a system includes a controller configured to receive a computer model of a mold configured to cast a part, wherein the computer model has a variable wall thickness of the mold thermally tailored to a geometry of the part. The controller is configured to control a manufacturing system to produce the mold based on the computer model.

The system of the preceding clause, wherein the variable wall thickness of the mold is designed to provide a desired solidification profile of the part during a casting process, wherein the solidification profile comprises a concave down solidification profile or a substantially flat solidification profile, wherein the concave down solidification profile is configured solidify material from a liquid state to a solid state in an outward direction from an interior to an exterior of the part during the casting process, wherein the substantially flat solidification profile is configured solidify material from the liquid state to the solid state in a substantially uniform manner in the interior and exterior of the part during the casting process.

The system of any preceding clause, wherein the turbomachinery part comprises an airfoil shaped blade or an airfoil shaped vane of a gas turbine system, wherein the first end is a leading edge and the second end is a trailing edge, wherein the turbomachinery part comprises a suction side and a pressure side on opposite sides of a camber line between the leading edge and the trailing edge, wherein the variable wall thickness comprises a first variable thickness between an interior and a suction side portion of the mold, wherein the variable wall thickness comprises a second variable thickness between the interior and a pressure side portion of the mold, wherein the first and second variable thicknesses vary along the camber line, wherein, for each point along the camber line, the first and second variable thicknesses are equal to another along lines perpendicular to the respective suction and pressure side portions of the mold.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a controller having a memory, a processor, and instructions stored on the memory and executable by the processor to:
   store on the memory a computer model of a mold configured to cast a part, wherein the computer model has a variable wall thickness of the mold thermally tailored to a geometry of the part to provide a desired solidification profile of the part during a casting process, wherein the variable wall thickness gradually varies along a first axis and a second axis, wherein the first and second axes are crosswise to one another; and control an additive manufacturing system to produce the mold based on the computer model, wherein the mold comprises a turbomachinery part mold and the part comprises a turbomachinery part, wherein the turbomachinery part comprises an airfoil shaped blade or an airfoil shaped vane of a gas turbine system, wherein the turbomachinery part varies in thickness along the first axis between a base and a tip and along the second axis between a leading edge and a trailing edge, wherein the variable wall thickness of the mold varies in an inverse manner relative to the thickness of the turbomachine part along the first axis between the base and the tip and along the second axis between the leading edge and the trailing edge, wherein the second axis comprise a camber line, wherein the turbomachinery part comprises a suction side and a pressure side on opposite sides of the camber line between the leading edge and the trailing edge, wherein the variable wall thickness comprises a first variable thickness between an interior and a suction side portion of the mold, wherein the variable wall thickness comprises a second variable thickness between the interior and a pressure side portion of the mold, wherein the first and second variable thicknesses vary along the camber line, wherein, for each point along the camber line, the first and second variable thicknesses are equal to another along lines perpendicular to the respective suction and pressure side portions of the mold.

2. The system of claim 1, wherein the solidification profile comprises a concave down solidification profile or a substantially flat solidification profile, wherein the concave down solidification profile is configured to solidify material from a liquid state to a solid state in an outward direction from an interior to an exterior of the part during the casting process, wherein the substantially flat solidification profile is configured to solidify the material from the liquid state to the solid state in a substantially uniform manner in the interior and exterior of the part during the casting process.

3. The system of claim 1, wherein the turbomachinery part comprises the airfoil shaped vane.

4. The system of claim 1, wherein the turbomachinery part comprises the airfoil shaped blade.

5. The system of claim 1, wherein the computer model of the mold comprises a computer aided design (CAD) model of the mold based at least in part on casting data and one or more models relating to the part.

6. The system of claim 1, wherein the mold comprises an inner curved surface along an interior of the mold and an outer curved surface along an exterior of the mold, wherein the variable wall thickness gradually varies between the inner and outer curved surfaces.

7. The system of claim 1, comprising the additive manufacturing system coupled to the controller.

8. The system of claim 1, wherein the controller is configured to control a casting system to cast the part using the mold.

9. The system of claim 8, comprising the casting system coupled to the controller, wherein the casting system comprises a furnace having a hot chamber and a cold chamber, wherein the controller is configured to control movement of the mold from the hot chamber to the cold chamber.

10. The system of claim 1, comprising the mold produced by the additive manufacturing system, the part produced by a casting system, or a combination thereof, based on the computer model of the mold.

11. A method, comprising:

receiving, via a controller, a computer model of a mold configured to cast a part, wherein the controller comprises a memory, a processor, and instructions stored on the memory and executable by the processor, wherein the computer model has a variable wall thickness of the mold thermally tailored to a geometry of the part to provide a desired solidification profile of the part during a casting process, wherein the variable wall thickness gradually varies along a first axis and a second axis, wherein the first and second axes are crosswise to one another; and controlling, via the controller, an additive manufacturing system to produce the mold based on the computer model, wherein the mold comprises a turbomachinery part mold and the part comprises a turbomachinery part, wherein the turbomachinery part comprises an airfoil shaped blade or an airfoil shaped vane of a gas turbine system, wherein the turbomachinery part varies in thickness along the first axis between a base and a tip and along the second axis between a leading edge and a trailing edge, wherein the variable wall thickness of the mold varies in an inverse manner relative to the thickness of the turbomachine part along the first axis between the base and the tip and along the second axis between the leading edge and the trailing edge, wherein the second axis comprise a camber line, wherein the turbomachinery part comprises a suction side and a pressure side on opposite sides of the camber line between the leading edge and the trailing edge, wherein the variable wall thickness comprises a first variable thickness between an interior and a suction side portion of the mold, wherein the variable wall thickness comprises a second variable thickness between the interior and a pressure side portion of the mold, wherein the first and second variable thicknesses vary along the camber line, wherein, for each point along the camber line, the first and second variable thicknesses are equal to another along lines perpendicular to the respective suction and pressure side portions of the mold.

12. The method of claim 11, wherein the solidification profile comprises a concave down solidification profile or a substantially flat solidification profile, wherein the concave down solidification profile is configured to solidify material from a liquid state to a solid state in an outward direction from an interior to an exterior of the part during the casting process, wherein the substantially flat solidification profile is configured to solidify the material from the liquid state to the solid state in a substantially uniform manner in the interior and exterior of the part during the casting process.

13. The method of claim 11, comprising manufacturing the turbomachine part using the mold.

14. The method of claim 12, wherein manufacturing the turbomachine part comprises casting the turbomachine part in a casting system using the mold.

15. The method of claim 13, comprising assembling the turbomachine part into the gas turbine system.

16. A system, comprising:

an additive manufacturing system configured to manufacture a mold configured to cast a part;

a controller configured to control the additive manufacturing system to manufacture the mold using a computer model of the mold, wherein the controller comprises a memory, a processor, and instructions stored on the memory and executable by the processor, and the computer model of the mold is stored on the memory, the mold manufactured by the additive manufacturing system, wherein the mold has a variable wall thickness thermally tailored to a geometry of the part to provide a desired solidification profile of the part during a casting process, wherein the variable wall thickness of the mold varies in an inverse manner relative to a thickness of the part along a first axis and a second axis, wherein the first and second axes are crosswise to one another, wherein the mold comprises a turbomachinery part mold and the part comprises a turbomachinery part, wherein the turbomachinery part comprises an airfoil shaped blade or an airfoil shaped vane of a gas turbine system, wherein the turbomachinery part varies in thickness along the first axis between a base and a tip and along the second axis between a leading edge and a trailing edge, wherein the variable wall thickness of the mold varies in an inverse manner relative to the thickness of the turbomachine part along the first axis between the base and the tip and along the second axis between the leading edge and the trailing edge, wherein the second axis comprise a camber line, wherein the turbomachinery part comprises a suction side and a pressure side on opposite sides of the camber line between the leading edge and the trailing edge, wherein the variable wall thickness comprises a first variable thickness between an interior and a suction side portion of the mold, wherein the variable wall thickness comprises a second variable thickness between the interior and a pressure side portion of the mold, wherein the first and second variable thicknesses vary along the camber line, wherein, for each point along the camber line, the first and second variable thicknesses are equal to another along lines perpendicular to the respective suction and pressure side portions of the mold.

17. The system of claim 16, wherein the solidification profile comprises a concave down solidification profile or a substantially flat solidification profile, wherein the concave down solidification profile is configured solidify material from a liquid state to a solid state in an outward direction from an interior to an exterior of the part during the casting process, wherein the substantially flat solidification profile is configured solidify the material from the liquid state to the solid state in a substantially uniform manner in the interior and exterior of the part during the casting process.

18. The system of claim 16, wherein the turbomachinery part comprises the airfoil shaped blade.

19. The system of claim 16, wherein the turbomachinery part comprises the airfoil shaped vane.

* * * * *